United States Patent [19]
Fujii et al.

[11] Patent Number: 5,322,874
[45] Date of Patent: Jun. 21, 1994

[54] ELECTROCONDUCTIVE RESIN COMPOSITION

[75] Inventors: Takeshi Fujii, Sodegaura; Manabu Ishikawa, Ichihara, both of Japan

[73] Assignee: Sumitomo Chemical Company, Limited, Osaka, Japan

[21] Appl. No.: 979,915

[22] Filed: Nov. 23, 1992

[30] Foreign Application Priority Data

Mar. 27, 1992 [JP] Japan .................................. 4-070645

[51] Int. Cl.⁵ .......................... C08K 5/20; C08L 71/12
[52] U.S. Cl. .................................... 524/227; 524/413; 524/435; 524/439; 524/440; 524/495; 524/611
[58] Field of Search ............... 524/227, 407, 413, 424, 524/435, 439, 440, 495, 611

[56] References Cited

U.S. PATENT DOCUMENTS

| | | | |
|---|---|---|---|
| 3,751,388 | 8/1973 | Tabana et al. | 524/227 |
| 4,270,933 | 6/1981 | Meny et al. | 55/279 |
| 4,530,952 | 7/1985 | Tayama et al. | 524/159 |
| 4,623,951 | 11/1986 | DuPont et al. | 524/424 |
| 4,680,139 | 7/1987 | Williams et al. | 524/424 |
| 4,705,646 | 11/1987 | DuPont et al. | 524/424 |
| 4,734,450 | 3/1988 | Kawai et al. | 524/424 |

FOREIGN PATENT DOCUMENTS

| | | |
|---|---|---|
| 0077059 | 4/1983 | European Pat. Off. . |
| 0355602 | 2/1990 | European Pat. Off. . |
| 0450483 | 10/1991 | European Pat. Off. . |
| 60-44547 | 3/1985 | Japan . |
| 3066756 | 3/1991 | Japan ................................. 524/424 |

*Primary Examiner*—Kriellion S. Morgan
*Attorney, Agent, or Firm*—Stevens, Davis, Miller & Mosher

[57] ABSTRACT

Disclosed is an electroconductive resin composition comprising 100 parts by weight of a polyphenylene ether, 1 to 50 parts by weight of a diamide compound and 5 to 35 parts by weight of a carbon black having a dibutyl phthalate absorption of 70 ml/100 mg or more. This composition is excellent in electroconductivity, processability and heat resistance.

8 Claims, No Drawings

ELECTROCONDUCTIVE RESIN COMPOSITION

BACKGROUND OF THE INVENTION

Polyphenylene ether resins are thermoplastic resins excellent in various properties such as mechanical properties, heat resistance and dimensional stability.

However, polyphenylene ether resins alone are considerably inferior in impact strength and solvent resistance and are unsatisfactory in processability due to their high melt viscosity. Therefore, the processability is improved by blending polystyrene resins compatible with polyphenylene ether resins. Furthermore, many of polyphenylene ether resin compositions are nonelectroconductive and for electrostatic coating of the molded articles, the articles are undercoated with electroconductive primers or electroconductive particles, flakes or fibers, especially preferably electroconductive carbon black are incorporated into the compositions. On the other hand, demand for development of materials having high heat resistance and dimensional stability and besides having antistatic properties and electroconductivity has recently increased in the electric and electronic fields.

SUMMARY OF THE INVENTION

The object of the present invention is to provide a resin composition comprising a polyphenylene ether resin or a polyphenylene ether resin and a styrene resin to which electroconductive particles are added to reduce surface resistivity of molded articles and impart electroconductivity wherein the processability which deteriorates owing to the addition of the electroconductive particles is improved.

The inventors have obtained a resin composition excellent in electroconductivity, processability, heat resistance and dimensional stability by adding a specific diamide compound to an electroconductive composition comprising a polyphenylene ether resin or a polyphenylene ether resin and a styrene resin and additionally a specific amount of carbon black. Thus, the present invention has been accomplished.

That is, the present invention relates to an electroconductive resin composition comprising:

(a) 100 parts by weight of a polyphenylene ether or a mixture of a polyphenylene ether and a styrene resin having a weight ratio of polyphenylene ether and styrene resin of 100/0 to 30/70.

(b) 1 to 50 parts by weight of a diamide compound, (c) 5–35 parts by weight of carbon black having a dibutyl phthalate absorption of 70 ml/100 mg or more, (d) 0 to 50 parts by weight of a rubber-like material, (e) 0 to 50 parts by weight of an electroconductive inorganic filler, and (f) 0 to 20 parts by weight of a polyolefin.

DESCRIPTION OF THE INVENTION

The polyphenylene ether (a) used in the present invention is a polymer obtained by oxidative polymerization of one or more phenol compounds represented by the following formula:

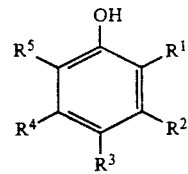

(wherein $R^1$, $R^2$, $R^3$, $R^4$ and $R^5$ each represents a hydrogen atom, a halogen atom, a hydrocarbon group or a substituted hydrocarbon group and at least one of them is a hydrogen atom) with oxygen or a gas containing oxygen using an oxidative coupling catalyst.

Examples of $R^1$, $R^2$, $R^3$, $R^4$ and $R^5$ in the above formula are hydrogen, chlorine, bromine, fluorine, iodine, methyl, ethyl, n- or iso-propyl, pri-, sec- or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the compounds represented by the above formula are phenol, o-, m- or p-cresol, 2,6-, 2,5-,2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol.

Furthermore, the polyphenylene ethers may be copolymers of the phenol compounds of the above formula with other phenol compounds, for example, polyhydric hydroxy aromatic compounds such as bisphenol A, tetrabromobisphenol A, resorcin, hydroquinone and novolak resins.

Among these compounds, preferred are homopolymers of 2,6-dimethylphenol or 2,6-phenylphenol and copolymers of major amount of 2,6-xylenol and minor amount of 3-methyl-6-t-butylphenol or 2,3,6-trimethylphenol.

Any oxidative coupling catalysts may be used for oxidative polymerization as far as they have polymerization ability.

Furthermore, the polyphenylene ether resins include the above-mentioned polyphenylene ethers on which styrene compounds or other polymers are grafted.

As the styrene compounds, mention may be made of styrene, α-methylstyrene, p-methylstyrene, vinyltoluene and chlorostyrene.

The styrene resins are specifically polymers comprising one or more polymerization units selected from styrene, α-methylstyrene, p-methylstyrene and the like and examples thereof are polystyrene, rubber-reinforced polystyrenes (CHIPS), poly(α-methylstyrene), poly(p-methylstyrene), styrene-acrylonitrile copolymer and styrene-maleic acid copolymer.

Preferred range of molecular weight of the polyphenylene ethers is 0.3 to 0.6 dl/g and more preferred range is 0.35 to 0.5 dl/g shown by reduced viscosity measured using chloroform at 25° C. The most preferred range is 0.35 to 0.45 dl/g. If molecular weight is less than the above range, mechanical strength of the composition is low and if it is more than the range, processability of the composition deteriorates.

Mixing ratio of the polyphenylene ether and the styrene resin is 100/0 to 30/70 in weight ratio. The weight ratio is preferably in the range of 95/5 to 30/70 and more preferably in the range of 90/10 to 40/60. If the proportion of the polyphenylene ether is less than the above range, processability of the composition is improved, but heat resistance deteriorates and the object of the present invention cannot be attained.

As the diamide compound of component (b) used in the present invention, there may be used preferably those which are represented by the following formula:

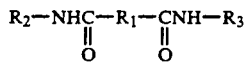

(wherein $R_1$ represents a straight chain or branched chain saturated or unsaturated hydrocarbon residue, an alicyclic hydrocarbon residue or an aromatic hydrocarbon residue of 2 to 20 carbon atoms or a derivative residue thereof and $R_2$ and $R_3$ each represents a straight chain or branched chain saturated or unsaturated hydrocarbon residue, an alicyclic hydrocarbon residue or an aromatic hydrocarbon residue of 1 to 10 carbon atoms or a derivative residue thereof and $R_2$ and $R_3$ may be identical or different.

As examples of $R_1$, mention may be made of dodecamethylene group, biphenylene group, diphenylenemethane group, or derivative residues obtained by bonding a plurality of, for example, methylene group, ethylene group, trimethylene group, propylene group, tetramethylene group, isobutylene group, pentamethylene group, cyclopentylene group, hexamethylene group, cyclohexylene group, octamethylene group, decamethylene group, phenylene group, naphthalene group and the like through the following groups.

| | |
|---|---|
| —O— | (oxy group) |
| —S— | (thio group) |
| —SO$_2$— | (sulfonyl group) |
| —CO— | (carbonyl group) |
| —COO— | (carbonyloxy group) |

As examples of $R_2$ and $R_3$, mention may be made of methyl group, ethyl group, propyl group, isopropyl group, butyl group, isobutyl group, t-butyl group, pentyl group, isopentyl group, cyclopentyl group, hexyl group, isohexyl group, cyclohexyl group, heptyl group, octyl group, decyl group, phenyl group and naphthyl group.

$R_1$, $R_2$ and $R_3$ can have one or more substituents and examples of the substituents are enumerated below.

| | |
|---|---|
| —R$_4$ | (R$_4$: C$_1$-C$_{10}$ Hydrocarbon groups) |
| —X | (X: Halogens such as Cl, Br, F) |
| —OR$_5$ | (R$_5$: H or C$_1$-C$_{10}$ hydrocarbon groups) |
| —NR$_6$R$_7$ | (R$_6$, R$_7$: H or C$_1$-C$_{10}$ hydrocarbon groups) |
| —OCOR$_8$ | (R$_8$: C$_1$-C$_{10}$ Hydrocarbon groups) |
| —COOR$_9$ | (R$_9$: H or C$_1$-C$_{10}$ hydrocarbon groups) |
| —COR$_{10}$ | (R$_{10}$: C$_1$-C$_{10}$ Hydrocarbon groups) |
| —SO$_2$R$_{11}$ | (R$_{11}$: OH or C$_1$-C$_{10}$ hydrocarbon groups) |
| —NO$_2$ | |
| —NO | |
| —CN | |

The diamide compound of component (b) used in the present invention is compatible with the matrix component in fluid state at the time of molding while it is crystallized and is phase-separated from the matrix component in use. Therefore, melting point of the diamide compound is preferably somewhat lower than the molding temperature.

Molding temperature of the polyphenylene ether compositions is generally 105° to 350° C., preferably 200° to 300° C. Therefore, melting point of the diamide compound used in the present invention is preferably in the range of 105° to 350° C., more preferably in the range of 150° to 300° C.

However, when the molding temperature deviates from the above range owing to addition of stabilizers or plasticizers diamide compounds differing in melting point depending on the molding temperatures can be used.

Addition amount of the diamide compound (b) is in the range of 1 to 50 parts by weight, preferably 2 to 30 parts by weight, especially preferably 2 to 20 parts by weight based on 100 parts by weight of the component (a). If the addition amount is less than 1 part by weight, effect to improve processability of the composition can be obtained with difficulty and if it is more than 50 parts by weight, processability can be improved, but heat resistance deteriorates.

Carbon blacks of the component (c) used in the present invention are those which are used for coloration, reinforcement of rubber or impartation of electroconductivity, and, in order to efficiently impart electroconductivity regarding addition amount of carbon blacks, it is necessary that the carbon blacks have a dibutyl phthalate absorption of 70 ml/100 mg or more. The dibutyl phthalate absorption here is a value measured by the method specified in ASTM D2414. The dibutyl phthalate absorption is preferably 100 ml/100 mg or more, more preferably 150 ml/100 mg or more. Especially preferred carbon blacks include acetylene black obtained by thermal decomposition of acetylene gas and Ketjen Black obtained by furnace type incomplete combustion of fuel oils. These carbon blacks can efficiently improve electroconductivity with a small addition amount.

Addition amount of carbon black (c) is 5 to 35 parts by weight, preferably 5 to 30 parts by weight and especially preferably 8 to 30 parts by weight based on the component (a).

If addition amount is less than 5 parts by weight, antistatic properties and electroconductivity of the composition are insufficient and if it is more than 35 parts by weight, melt viscosity of the composition increases in molding to cause deterioration of processability.

Rubber-like materials may be used as component (d) in order to improve impact strength. The rubber-like materials mean natural and synthetic polymer materials which are elastic at room temperature.

Especially preferred rubbers include, for example, ethylene-propylene copolymer rubber, ethylene-propylene-non-conjugated diene copolymer rubber, ethylene-butene-1 copolymer rubber, polybutadiene, styrene-butadiene block copolymer rubber, styrenebutadiene copolymer rubber, partially hydrogenated styrene-butadiene-styrene block copolymer rubber, styrene-isoprene block copolymer rubber, partially hydrogenated styrene-isoprene block copolymer rubber, polyurethane rubber, styrene-grafted ethylene-propylene-non-conjugated diene copolymer rubber, styrene-grafted ethylene-propylene copolymer rubber, styrene/acrylonitrile-grafted ethylene-propylene-non-conjugated diene copolymer rubber, styrene/acrylonitrile-grafted ethylenepropylene copolymer rubber and mixtures thereof. Furthermore, the rubber-like materials may be modified rubbers which are modified with other functional monomers containing acids or epoxy.

Addition amount of the rubber-like materials (d) is 0 to 50 parts by weight based on 100 parts by weight of the component (a). If it exceeds 50 parts by weight, heat resistance and processability of the composition deteriorate.

In the present invention, electroconductive inorganic fillers (e) may be added to the resin compositions. The electroconductive inorganic fillers are added for improvement of electroconductivity and rigidity. Suitable electroconductive inorganic fillers include, for example, surface-treated potassium titanate whisker, carbon fibers and stainless steel fibers. These electroconductive inorganic fillers may be used each alone or in combination. Addition of these electroconductive inorganic fillers to the composition of the present invention further improves antistatic properties or electroconductivity of the composition and so is preferred.

Addition amount of the electroconductive inorganic fillers (e) is 0 to 50 parts by weight based on 100 parts by weight of the component (a). If it exceeds 50 parts by weight, heat resistance is improved, but processability undesirably deteriorates.

Furthermore, polyolefin resins (f) may be added to the composition for improving processability. Suitable plyolefin resins include, for example, low-density polyethylenes, high-density polyethylenes, linear low-density polyethylenes, polypropylenes, and poly-4-methylpentene-1. Especially preferred polyolefin resins are low-density polyethylenes and linear low-density polyethylenes.

Addition amount of the polyolefin resins (f) is 0 to 20 parts by weight based on 100 parts by weight of the component (a).

If the addition amount of the polyolefin resins exceeds 20 parts by weight, processability is improved, but the problem of delamination occurs in the molded article at the gate and this is not desired.

Besides, customarily used additives such as pigments, coating materials, flame retardants, plasticizers, antioxidants and weather-proofing agents may be further added to the composition of the present invention.

The thermoplastic composition of the present invention can be obtained by blending and melt-kneading the components (a) to (f) by conventional methods using customary kneading means such as extruder, kneader, roll mixer and Banbury mixer.

The present invention will be explained in detail by the following examples, but it should be understood that they are exemplary only, and should not be constructed as limiting the invention in any manner.

The components of respective examples and comparative examples were blended at the proportions (part by weight) as shown in Tables 2 to 9 and each of the resulting blends was extruded by TEM 50 twin-screw extruder (Toshiba Machine Co., Ltd.) at a cylinder temperature of 280° C., cooled in a water tank and then pelletized by a strand cutter.

The resulting pellets were subjected to hot-air drying at 100° C. for 4 hours and then molded into test pieces by Sumitomo Nestar injection molding machine Sicap 110/50 (Sumitomo Heavy Industries Ltd.) at a cylinder temperature of 310° C., an injection pressure of 1500 kg/cm² and a mold temperature of 80° C.

The thus obtained test pieces were tested by the following methods to obtain data. The results are shown in Tables 2 to 9.

In the present invention it is important that the composition is balanced in the following properties and preferably has an S.R. of $10^{10}$ Ω or less, an MFR of 0.5 g/10 min or more, an HDT of 90° C. or higher and an Izod impact strength of 2 kg·cm/cm or more and shows no delamination.

(1) S.R. (Surface resistivity; Ω):

A plate of 80 mm×80 mm obtained by the injection molding was subjected to measurement of surface resistivity by R8340 digital ultra-high resistometer (Advantest Co.).

(2) MFR (Melt flow rate; g/10 min):

MFR was measured in accordance with ASTM D-1238 with a load of 10 kg and by setting the temperature at 280° C. unless otherwise notified.

(3) Izod impact strength (kg·cm/cm):

Izod impact strength was measured in accordance with ASTM D-256 using a notched test piece of 3.2 mm thick.

(4) HDT (° C.):

HDT was measured in accordance with ASTM D-648 under application of a fiber stress of 18.6 kg/cm².

(5) Delamination

When no delamination occurred in the test piece obtained by the above injection molding, this is shown by "o" and when delamination occurred, this is shown by "x".

The following materials were used for preparing the compositions of the examples and the comparative examples.

Polyphenylene ether, PPE:

Polyphenylene ethers (Sumitomo Chemical Co., Ltd.) obtained by homopolymerization of 2,6-dimethylphenol and having an intrinsic viscosity (measured in chloroform at 25° C.) of 0.2 dl/g (Example 6), 0.4 dl/g (Examples 1 to 5, 12 to 18 and Comparative Examples 1 to 5, 7 to 9), 0.46 dl/g (Examples 8 to 11 and Comparative Example 6) and 0.70 dl/g (Example 7) were used.

Styrene resins:

Rubber reinforced polystyrene (HIPS) and polystyrene (GPPS) were used as styrene resins.

Esbrite® 500HRY3 (Japan Polystyrene Co.) was used as the rubber reinforced polystyrene and Esbrite® 2V-60 (Japan Polystyrene Co.) was used as the polystyrene.

Diamide compounds:

N,N'-diphenyladipamide, represented by the following formula was used as diamide compound.

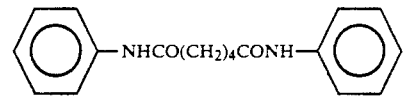

Carbon black:

Carbon blacks shown in the following Table 1 were used.

TABLE 1

| Name of grade | Makers | DBP absorption (ml/100 g) |
| --- | --- | --- |
| Acetylene black (Denka black) | Denki Kagaku Kogyo K.K. | 212 |
| Ketjen black (600 JD) | Lion Yushi Co. | 495 |
| Balkan C | Cabot Corp. | 100 |
| Furnace black (Dia black #45) | Mitsubishi Chemical Industries, Ltd. | 55 |

Rubber-like materials:

Califlex TR 1101 (Shell Chemical Co.) was used as styrene-butadiene-styrene block copolymer (SBS).

Electroconductive inorganic fillers:

Carbon fibers: Magnamite 1800AS (Hercules Inc.)
Stainless steel fibers: Nasron (diameter 12 μm) (Nihon Seisen Co.)
Potassium titanate whisker: Dentol WK-200 (Otsuka Chemical Co.)

Polyolefins:
Low-density polyethylene: Sumikathene® F210-6 (Sumitomo Chemical Co., Ltd.)

TABLE 2

|  | Example 1 | Example 2 | Comparative Example 2 |
|---|---|---|---|
| PPE | 60 | 70 | 100 |
| HI-PS | 40 | 20 | — |
| GP-PS | — | 10 | — |
| N,N'-diphenyl-adipamide | 10 | 10 | 10 |
| Acetylene black | 24 | 24 | 3 |
| S.R. | $4 \times 10^5$ | $3 \times 10^5$ | $3 \times 10^{16}$ |
| MRF | 42 | 30 | 40 |
| HDT | 120 | 130 | 160 |
| Izod impact strength | 3 | 2 | 4 |
| Delamination | ○ | ○ | ○ |

TABLE 3

|  | Example 3 | Comparative Example 2 | Comparative Example 3 | Comparative Example 4 | Example 4 |
|---|---|---|---|---|---|
| PPE | 100 | 100 | 100 | 100 | 100 |
| N,N'-diphenyl-adipamide | 10 | 10 | 10 | — | 5 |
| Acetylene black | 24 | 40 | 120 | 22 | 23 |
| S.R. | $1 \times 10^5$ | $<10^4$ | $<10^4$ | $3 \times 10^5$ | $1 \times 10^5$ |
| MRF | 14 | <0.1 | <0.1 | 0.1 | 5 |
| HDT | 160 | — | — | 175 | 170 |
| Izod impact strength | 2 | — | — | 2 | 2 |
| Delamination | ○ | — | — | — | — |

TABLE 4

|  | Example 5 | Comparative Example 5 | Example 6 | Example 7 | Example 8 |
|---|---|---|---|---|---|
| PPE | 100 | 100 | 100 | 100 | 100 |
| N,N'-diphenyl-adipamide | 18 | 70 | 10 | 10 | 10 |
| Acetylene black | 26 | 37 | 24 | 24 | 24 |
| S.R. | $1 \times 10^5$ | $1 \times 10^5$ | $1 \times 10^5$ | $1 \times 10^5$ | $3 \times 10^5$ |
| MRF | 19 | >250 | 220 | 0.8 | 8 |
| HDT | 160 | 110 | 150 | 162 | 160 |
| Izod impact strength | 2 | <1 | <2 | 3 | 2 |

TABLE 5

|  | Example 9 | Example 10 | Example 11 | Comparative Example 6 |
|---|---|---|---|---|
| PPE | 90 | 60 | 40 | 20 |
| HI-PS | 10 | 40 | 60 | 80 |
| N,N'-diphenyl-adipamide | 10 | 10 | 10 | 10 |
| Acetylene black | 24 | 24 | 24 | 24 |
| S.R. | $2 \times 10^5$ | $2 \times 10^5$ | $2 \times 10^5$ | $1 \times 10^5$ |
| MRF | 10 | 36 | 94 | 210 |
| HDT | 150 | 125 | 100 | 80 |
| Izod impact strength | 2 | 3 | 3 | 2 |

TABLE 6

|  | Example 12 | Example 13 | Comparative Example 7 |
|---|---|---|---|
| PPE | 100 | 100 | 100 |
| N,N'-diphenyl-adipamide | 10 | 10 | 10 |
| Ketjen black | 8 | — | — |
| Balkan C | — | 33 | — |
| Dia black | — | — | 40 |
| S.R. | $2 \times 10^5$ | $4 \times 10^7$ | $5 \times 10^{14}$ |
| MRF | 3.6 | 38 | 55 |
| HDT | 170 | 158 | 156 |
| Izod impact strength | 3 | 2 | <2 |

TABLE 7

|  | Example 14 | Comparative Example 7 |
|---|---|---|
| PPE | 100 | 100 |
| N,N'-diphenyl-adipamide | 10 | 10 |
| Acetylene black | 28.6 | 37.4 |
| SBS | 20 | 60 |
| S.R. | $8 \times 10^5$ | — |
| MRF | 0.5 | <0.01 |
| HDT | 140 | — |
| Izod impact strength | 3 | — |

TABLE 8

|  | Example 15 | Example 16 | Example 17 |
|---|---|---|---|
| PPE | 100 | 100 | 100 |
| N,N'-diphenyl-adipamide | 10 | 10 | 10 |
| Acetylene black | 25 | 25 | 25 |
| Electro-conductive inorganic filler (kind) | 5 (Carbon fibers) | 5 (Stainless steel fibers) | 5 (Potassium titanate whisker) |
| S.R. | $<10^4$ | $<10^4$ | $5 \times 10^5$ |
| MRF | 8 | 12 | 12 |
| HDT | 164 | 161 | 162 |
| Izod impact strength | 3 | 3 | 2 |

TABLE 9

|  | Example 18 | Comparative Example 9 |
|---|---|---|
| PPE | 100 | 100 |
| N,N'-diphenyl-adipamide | 10 | 10 |
| Acetylene black | 25 | 31 |
| Low-density polyethylene | 2 | 30 |
| S.R. | $1 \times 10^5$ | $6 \times 10^5$ |
| MRF | 14 | 38 |
| HDT | 160 | 152 |
| Izod impact strength | 3 | 5 |
| Delamination | o | x |

As explained above, the present invention can provide a resin composition excellent in electroconductivity, processability, heat resistance and dimensional stability by adding a specific diamide compound to an electroconductive composition comprising a polyphenylene ether resin or polyphenylene ether resin and a styrene resin to which a specific amount of carbon black is added.

What is claimed is:

1. An electroconductive resin composition which comprises:
   (a) 100 parts by weight of a polyphenylene ether or a mixture of a polyphenylene ether and a styrene resin having a weight ratio of polyphenylene ether and styrene resin of 100/0 to 30/70,
   (b) 1 to 50 parts by weight of a diamide compound,
   (c) 5 to 35 parts by weight of a Ketjen carbon black having a dibutyl phthalate absorption of 70 ml/100 mg or more,
   (d) 0 to 50 parts by weight of a rubber-like material,
   (e) 0 to 50 parts by weight of an electro-conductive inorganic filler, and
   (f) 0 to 20 parts by weight of a polyolefin.

2. A resin composition according to claim 1, wherein the polyphenylene ether of the component (a) has an intrinsic viscosity of 0.3 to 0.6 dl/g.

3. A resin composition according to claim 1, wherein the styrene resin of the component (a) is a styrene homopolymer and/or a rubber reinforced polystyrene.

4. A resin composition according to claim 1, wherein the diamide compound of the component (b) is represented by the following formula:

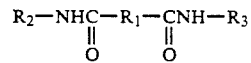

wherein $R^1$ represents a straight chain or branched chain saturated or unsaturated hydrocarbon residue, an alicyclic hydrocarbon residue or an aromatic hydrocarbon residue of 2 to 20 carbon atoms or a derivative residue thereof and $R_2$ and $R_3$ each represents a saturated or unsaturated straight chain or branched chain hydrocarbon residue, alicyclic hydrocarbon residue or aromatic hydrocarbon residue of 1 to 10 carbon atoms or a derivative residue thereof and $R_2$ and $R_3$ may be identical or different.

5. A resin composition according to claim 1, wherein the electroconductive inorganic filler of the component (e) is a carbon fiber.

6. A resin composition according to claim 1, wherein the electroconductive inorganic filler of the component (e) is a stainless steel fiber.

7. A resin composition according to claim 1, wherein the electroconductive inorganic filler of the component (e) is a potassium titanate whisker.

8. A resin composition according to claim 1, wherein the polyolefin of the component (f) is a low-density polyethylene or a linear low-density polyethylene.

* * * * *